Feb. 4, 1964 J. P. MESSLER 3,120,074
FISHING LURE
Filed July 30, 1962
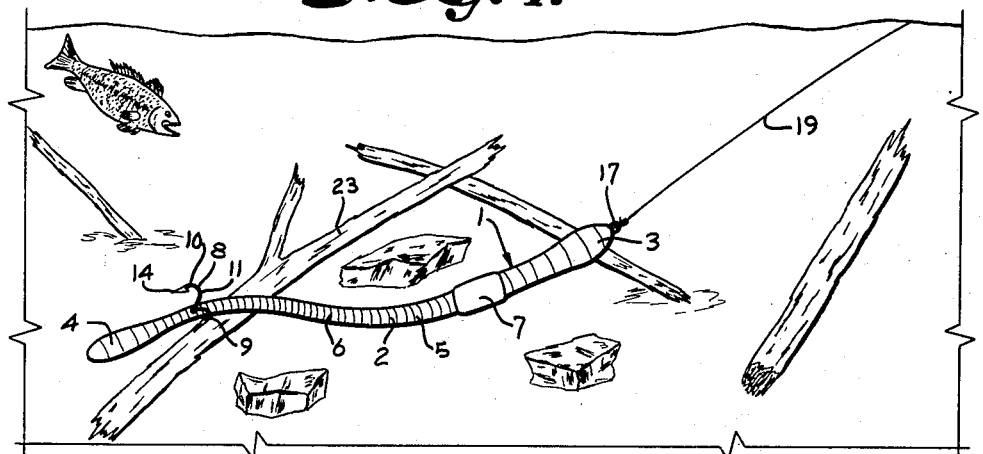
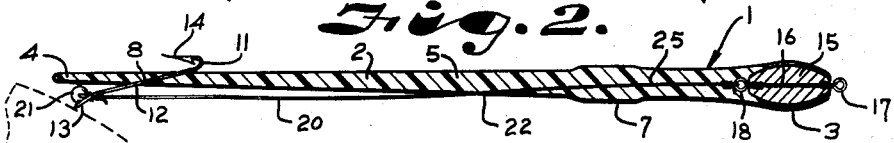
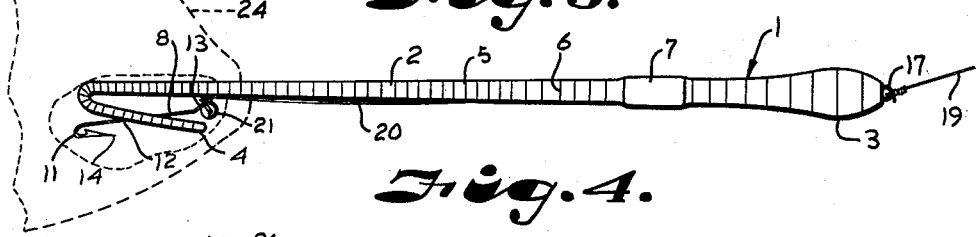
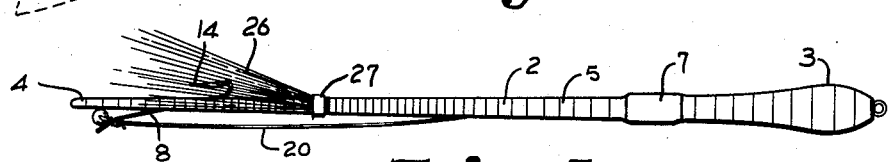
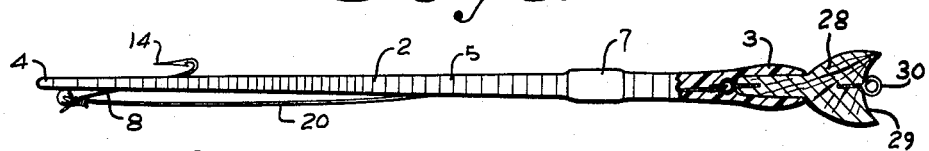
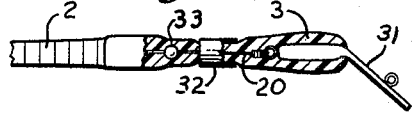
INVENTOR.
JOSEPH P. MESSLER
BY
Fishburn and Gold
ATTORNEYS

United States Patent Office 3,120,074
Patented Feb. 4, 1964

3,120,074
FISHING LURE
Joseph P. Messler, 723 E. 2nd St., Tulsa, Okla.
Filed July 30, 1962, Ser. No. 213,239
10 Claims. (Cl. 43—35)

This invention relates to a fishing lure, and more particularly to an artificial bait which is snag-resistant or "weedless" and yet highly efficient in hooking fish.

The conventional snag-resistant fishing lure includes a spring-mounted wire or the like which urges marine plants or debris away from the bight of the hook but is intended to be easily compressed out of the way when the lure is swallowed by a fish. Such devices, of necessity, offer resistance against hooking in the most critical area, that is at the point or barb of the hook and the lure may be disgorged before embedding in the fish. Other "weedless" fishing lures have been developed which use a taut line secured at the forward end thereof and a slack line secured at the rear and have a hook with the bight pointing rearwardly. The forward line is intended to break when the lure is swallowed by a fish whereby slack is taken up on the line connected to the rear for turning the lure around within the fish to present the bight of the hook in a direction which snags the fish. Such devices, however, require the continual replacement of the broken forward line with special lines of highly predictable tensile strength and also presupposes sufficient room within the fish for the lure to bodily turn to a rear-forward position without being withdrawn or disgorged. Additional "weedless" fishing lures have been developed having hooks which are normally positioned on the lure with the bight pointing rearwardly, however, the hook is held by a spring clip and the action of the fish swallowing the lure must result in a definite separating force between the lure and the curved portion of the hook in order to release and move the hook into a position where it can bite into the fish. Still other "weedless" fish lures heretofore have carried hooks with the points thereof maintained in a protected position within or behind the lure and include spring-urged mechanisms for moving the hooks outwardly when sufficient line drag is applied thereon due to swallowing by a fish.

The prior art "weedless" lures, with the exception of those using a compressible wire for protecting the hook bight, are generally not well adaptable for use under fishing conditions which call for soft bait such as an artificial worm or other flexible-appearing animal. In addition, the prior art devices above-mentioned have proved to be relatively complex, expensive and often unreliable in use.

The principal objects of the present invention are: to provide a "weedless" fishing lure which is well adapted to be embodied in a characterization of a flexible bodied animal such as a worm; to provide such a lure which is of extremly simple construction and yet snag-proof without the use of auxiliary guards or devices; to provide an artificial fish bait wherein the hook normally travels through the water with the rounded portion facing forwardly but is automatically turned within the mouth of a fish with minimal effort; to provide such a fishing lure which requires an exceedingly small space within the fish for rotating the hook; to provide such a device which relies upon the longitudinal stretchability of an elongated artificial worm or the like to induce the rotation of the hook to an embedding position within the fish; to provide such a "weedless" device which may be easily adapted for deep water fishing or surface water fishing; to provide such a fish bait which may include suitable skirts, bucktails, water popping devices or violent motion-producing devices; and to provide such an artificial lure which is inexpensive, requires no maintenance and displays only minimal portions of the hook.

Other objects and advantages of this invention will become apparent from the following description taken in connection with the accompanying drawings wherein are set forth by way of illustration and example certain embodiment of this invention.

FIG. 1 is a perspective view illustrating a fishing lure embodying this invention secured to a fishing line and being drawn forwardly beneath the surface of the water.

FIG. 2 is a cross-sectional view taken longitudinally through the fishing lure and illustrating the lure in a normal or unhooked condition.

FIG. 3 is a view in side elevation of the fishing lure with the hook rotated into a fish embedding position due to stretching of the lure body between the mouth of a fish and the front end of the lure.

FIG. 4 is a view in side elevation showing another embodiment of the fishing lure having a skirt or bucktail secured in the hook area.

FIG. 5 is a view in side elevation of a further embodiment of this invention with a portion broken away to show a "popper" float at the forward end thereof for top water fishing.

FIG. 6 is a fragmentary view of a still further embodiment of this invention with a portion broken away to show a bill embedded in the forward end thereof for inducing violent agitation or action of the lure in the water.

Referring to the drawings in more detail:

The reference numeral 1 indicates generally a "weedless" fishing lure embodying this invention. The fishing lure 1, in the illustrated example, is in the form of a worm which has an elongated elastic, flexible, easily stretchable body 2 of any suitable waterproof material. The body 2 is comprised of a forward end 3 and a rear end 4 and an intermediate portion 5 and is preferably molded with ring-like depressions 6 and an enlarged cylindrical member 7 to give the appearance of a natural worm.

A fish hook 8 is preferably composed of double hook portions 9 and 10 extending outwardly from each other at a non-critical angle of approximately 120 degrees. The hook portions 9 and 10 each have a curved section 11 located on one end of the fish hook and the hook portions 9 and 10 lead into adjacent relation to form a common or intermediate fish hook portion 12. An eyelet 13 is formed on the end of the fish hook 8 opposite from the curved portions 11.

The fish hook 8 extends obliquely through the elastic body 2 adjacent the body rear end 4, as best illustrated in FIG. 2. The fish hook intermediate portion 12 is at least partially embedded in and retained by the body 2 and the hook portions 9 and 10 and eyelet 13 are exposed on opposite sides of the body 2. The curved sections 11 of the fish hook 8 each terminate in a bight or barbed point 14 which points generally in the direction of the body rear end 4 when the lure body 2 is in the normal unstretched condition, as illustrated in FIGS. 1 and 2. Referring particularly to FIG. 2, the eyelet portion 13 is located substantially the length of the hook intermediate portion 12 closer to the body rear end 4 than the curved sections 11 when the body 2 is unstretched.

A retaining member, in the illustrated example a lead sinker 15 for deep fishing, is substantially completely embedded in and retained with respect to the body forward end 3, FIG. 2. The sinker 15 has a wire 16 extending longitudinally therethrough and terminating exteriorly at opposite ends thereof in eyelets 17 and 18. The eyelet 17 receives a suitable leader line or fishing line 19 in the usual manner, and the eyelet 18 has a control line 20 secured at one end thereto for a purpose described hereinafter. For shallow fishing or for a floating lure a lighter material, such as wood, cork or the like, may be substituted for the lead sinker 15.

A drilled bead or anchor member 21 receives and is secured to the other end of the line 20 and is of greater diameter than the fish hook eyelet 13. The control line 20 extends through the fish hook eyelet 13 whereby the eyelet is free to slip along the line 20 but is positively retained on the line 20 between the bead 21 and the sinker eyelet 18, FIG. 2. The control line 20, in the illustrated example, extends longitudinally within the body 2 from the sinker eyelet 18 to a point 22 located approximately midway of the body 2 from which the control line 20 continues rearwardly externally of the body to the bead 21. The control line 20 has a length which approximates the distance between the sinker eyelet 18 and the hook eyelet 13 when the body 2 is in the normal or unstretched condition.

Referring to FIG. 1, when the lure 1 is drawn through the water and strikes debris 23, there is litle tendency of the fish hook 8 to snag since the curved portions 11 are facing forwardly and the point or bight 14 is facing away from the direction of motion. When, however a fish closes its mouth about the lure, as indicated by the broken lines 24 in FIG. 3, the drag placed thereon between the fish and the fishing line 19 causes the body 2 to stretch. The control line 20 does not stretch under such conditions but merely slips through the mouth of the fish and causes the body 2 to bend and the fish hook 8 to rotate 180 degrees, presenting the point 14 in a forward direction for snagging and embedding into the mouth of the fish.

The line 20 may move with respect to the body 2 at the portion 25 which extends within the lure body to increase the length over which the body may stretch. It is noted that the greater portion of the tensile forces caused by hooking the fish are taken up by the control line 20 and not the lure body 2 whereby the lure body may be fabricated of very soft, pliable material for more life-like reproduction without undue regard to the tensile strength thereof under load.

An additional embodiment of this invention is shown in FIG. 4 wherein a skirt or bucktail 26 is fastened by a suitable ring 27 about the body 2 of the lure 1 and covering the hook bight. The skirt or bucktail 26 does not interfere with the operation of the lure since the portion of the body 2 located between the ring 27 and the sinker 15 is the portion which will usually stretch for rotating the hook 8.

Referring to FIG. 5, a further embodiment of this invention is illustrated wherein the sinker 15 is replaced by a float 28 for top water fishing. In the illustrated example, the float 28 is hollowed at 29 adjacent the fishing line eyelet 30 permitting the fisherman to "pop" the lure in the usual manner for attracting fish when conditions so require.

A still further embodiment of this invention is illustrated in FIG. 6 wherein a bill member 31 is substituted for the sinker 15. The bill 31 will cause the lure to violently agitate or wiggle as it is drawn through the water after being cast or when trolling to better attract fish when conditions so require. If desired, a confining rigid band 32 may be placed about the body 2 near the forward end 3 and a bead 33 may be fixed to the line 20 immediately rearwardly of the band 32 whereby slippage of the line 20 through the body 2 may be retarded by band interference with the bead 33.

It is to be understood that although the body 2 has been described as being entirely flexible, the fish hook 8 may be embedded in a rigid member without departing from the scope of this invention so long as a flexible joint is provided about which the hook can pivot and a stretchable portion is present to permit a relative movement with respect to a control line for pivoting the hook. It is to be further understood that although certain forms of this invention have been illustrated and described, it is not to be limited to the specific form or arrangement of parts herein described and shown except insofar as such limitations are included in the claims.

What I claim and desire to secure by Letters Patent is:

1. A fish lure comprising:
   (a) an elongated body having at least a portion thereof elastic and flexible and easily stretchable, said body having a forward end and a rear end,
   (b) an elongated fish hook having a curved section on one end thereof and an eyelet on the other end thereof and an intermediate portion therebetween,
   (c) said fish hook being mounted on said body with an intermediate portion of said body between said hook and said forward end, said curved section terminating in a point pointing generally in the direction of said body rear end when said body is in an unstretched condition,
   (d) said eyelet portion being located substantially the length of said hook intermediate portion closer to said body rear end than said curved section,
   (e) a retaining member mounted on said body near said body forward end,
   (f) a control line secured at one end thereof to said retaining member and anchored at the other end thereof in said eyelet, said control line being free from said body between said eylet and at least a portion of said body intermediate portion adjacent said hook,
   (g) said control line being a length approximating the distance between said retaining member and said eyelet when said body is in an unstretched condition, and
   (h) means on said retaining member for securing same to a fishing line, whereby said body normally presents hook with the point pointed rearwardly to avoid snagging but at least partially stretches under tension causing said control line to turn said hook for hooking a fish biting on said body.
2. The fish lure of claim 1 wherein:
   (a) said fish hook extends obliquely through said body adjacent said body rear end.
3. The fish lure of claim 2 wherein:
   (a) said hook curved section and eyelet are exposed on opposite sides of said body.
4. The fish lure of claim 1 wherein:
   (a) said retaining member is at least partially embedded in said body forward end.
5. The fish lure of claim 1 wherein:
   (a) said control line extends over a portion of the length thereof longitudinally within said body.
6. A fish lure comprising:
   (a) an elongated elastic flexible easily stretchable body having a forward end and a rear end and an intermediate portion,
   (b) an elongated fish hook having a curved section on one end thereof and an eyelet on the other end thereof and an intermediate portion therebetween,
   (c) said fish hook extending obliquely through said elastic body adjacent said body rear end, said fish hook intermediate portion being at least partially embedded in and retained by said body, said curved section and eyelet being exposed on opposite sides of said body, said curved portion terminating in a barbed point pointing generally in the direction of said body rear end when said body is in an unstretched condition,
   (d) said eyelet portion being located substantially the length of said hook intermediate portion closer to said body rear end than said curved section,
   (e) a retaining member at least partially embedded in and retained with respect to said body forward end,
   (f) an anchor member of greater diameter than said eyelet,
   (g) a control line secured at one end thereof to said retaining member and extending through said eyelet and secured at the other end thereof to said anchor member, (h) said control line being a length approximating the distance between said retaining member and said eyelet when said body is in an unstretched condition, and (i) means on said retaining member for securing same to a fishing line, whereby said body normally presents said hook with the point pointed rearwardly to avoid snagging but stretches under tension causing said control line to turn said hook for hooking a fish biting on said body.

7. The fish lure of claim 6 wherein:
(a) said body is in the form of an earthworm.

8. The fish lure of claim 6 wherein:
(a) said retaining member is a sinker.

9. The fish lure of claim 6 wherein:
(a) said retaining member is a float.

10. The fish lure of claim 1 wherein:
(a) said retaining member includes a band encircling said body and said control line near said forward end and a bead secured to said control line for interference with said band.

References Cited in the file of this patent
UNITED STATES PATENTS

| | | |
|---|---|---|
| 2,290,433 | Jeffers | July 21, 1942 |
| 2,792,662 | Norton | May 21, 1957 |
| 2,912,784 | Carlin | Nov. 17, 1959 |